July 21, 1942.   W. W. MORRAL ET AL   2,290,699
MACHINE FOR DEBUTTING AND HUSKING GREEN CORN
Filed Nov. 10, 1939   2 Sheets-Sheet 2
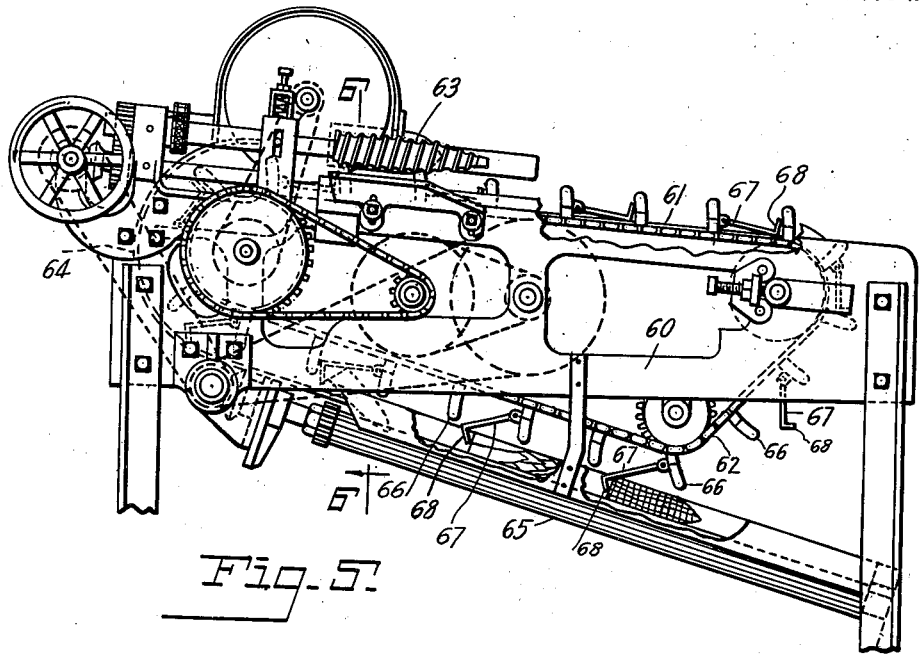
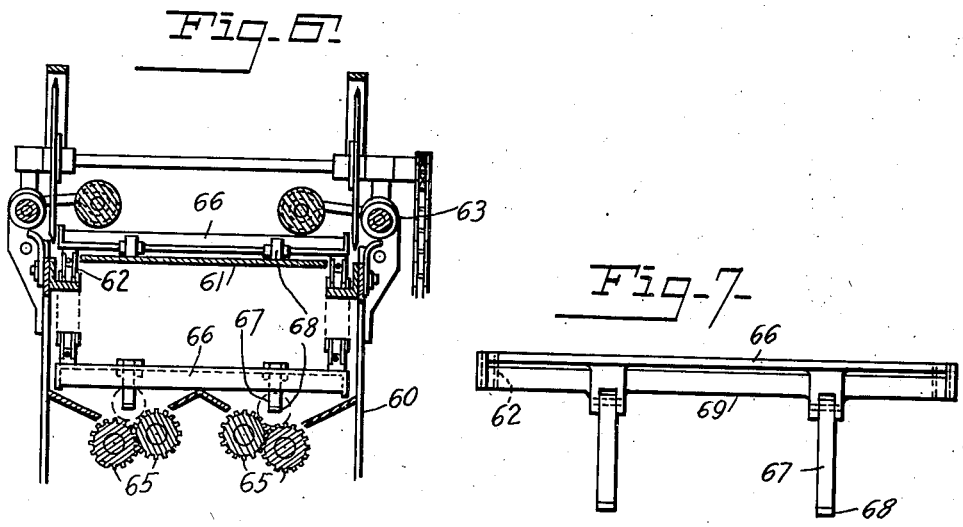
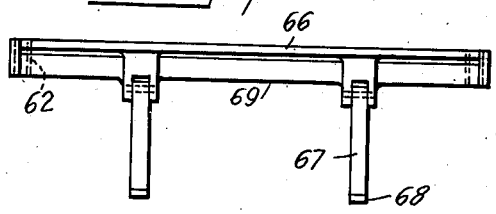
INVENTORS.
WILLIAM W. MORRAL
SAMUEL E. MORRAL
by
their ATTORNEY.

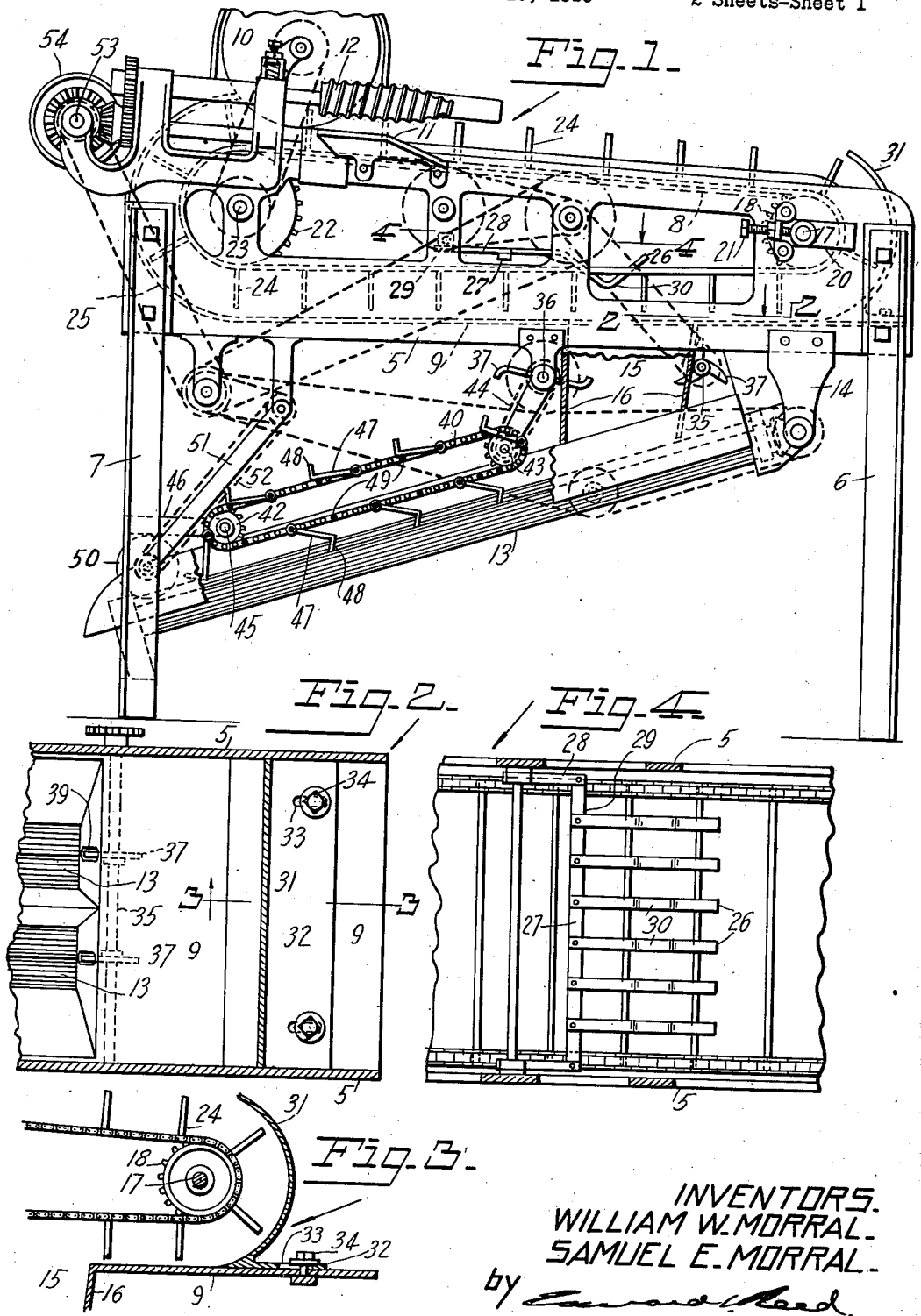

Patented July 21, 1942

2,290,699

UNITED STATES PATENT OFFICE 2,290,699

MACHINE FOR DEBUTTING AND HUSKING GREEN CORN

William W. Morral and Samuel E. Morral, Morral, Ohio

Application November 10, 1939, Serial No. 303,858

18 Claims. (Cl. 130—5)

This application is a continuation in part of our pending application filed January 16, 1936, Serial No. 59,383, and the invention relates to a machine for debutting and husking ears of green corn and more particularly to that type of machine in which the husking rollers extend lengthwise of the machine. In such a machine the butt removing device is mounted near the rear end of the machine and the husking rollers are mounted below the butt removing device and in some machines they are arranged with their discharge ends near the rear end of the machine. When the husking rollers are so arranged the ears of corn are carried between the flights of a conveyor to the butt removing device and then to a passageway or chute which delivers the same to the husking rollers near the front end of the machine. Usually the ears will drop from the conveyor when they are moved above the passageway or chute but occasionally an ear will, for some reason or another, lodge between the flights of the conveyor and be carried beyond the chute. As the flights move about the front support for the conveyor they will separate sufficiently to release the ear and permit the same to drop to the floor.

One object of the invention is to provide such a machine with means whereby an ear which is carried beyond the passageway will not be discharged from the machine but will be retained in engagement with the conveyor and again carried thereby to the passageway leading to the husking device.

A further object of the invention is to provide such a machine with means tending to dislodge the ears from the conveyor and thus materially reduce the number of ears which will be carried beyond the passageway.

A further object of the invention is to provide such a machine with means for preventing the ears from lodging in the passageway or chute leading to the husking rollers.

A further object of the invention is to provide a debutting and husking machine with means for positively moving the ears along the husking rollers without interfering with other parts of the mechanism.

Other objects of the invention may appear as the apparatus is described in detail.

In the accompanying drawings Fig. 1 is a side elevation, partly broken away, of a machine embodying the invention; Fig. 2 is a horizontal section taken on the line 2—2 of Fig. 1; Fig. 3 is a vertical section taken through the front portion of the conveyor and the guide on the line 3—3 of Fig. 2; Fig. 4 is a horizontal section taken on the line 4—4 of Fig. 1; Fig. 5 is a side elevation, partly broken away, of a similar machine having a slightly different arrangement of husking mechanism; Fig. 6 is a transverse sectional view taken on the line 6—6 of Fig. 5; and Fig. 7 is a detail view of one of the conveyor flights and its hook-shaped members.

As shown in Figs. 1 to 4 the machine comprises a main frame 5 carried by standards 6 and 7 and provided with an upper feed table 8 and a lower feed table 9. Mounted on the main frame near the rear end of the feed table 8 is a butt removing device which may be of any suitable character but preferably comprises a rotary cutter 10 and an ear gaging device including a stationary gage 11 and a rotary gage 12. Arranged below the lower feed table is a husking device which preferably comprises husking rollers 13 which extend for the major portion of the length of the machine and are supported at their front ends by brackets 14 carried by the main frame and are supported at their rear ends on standards 7, the rollers sloping toward the rear of the machine so that the ears may move lengthwise thereof by gravity. The lower table 9 is provided with an opening or passageway 15 arranged above the front or ear receiving ends of the husking rollers and this passageway preferably includes a chute 16 to guide the ears onto the husking rollers. The machine illustrated is a double machine of the type shown in Figs. 8 and 9 of Patent No. 1,963,141, granted June 19, 1934, to W. W. Morral, and includes two butt removing devices and two husking devices but the invention is equally applicable to a single machine and double machine. The two husking devices are shown in Fig. 2 but other features peculiar to a double machine have been omitted as they are not necessary to an understanding of the invention.

The ears of corn which are to be husked are moved over the upper feed table to the butt removing device and then over the lower feed table to the opening 15 by suitable conveying means, which preferably comprises a single endless conveyor having chains extending about sprocket wheels at the respective ends of the machine. The front sprocket wheels 18, one only of which is shown, are carried by a shaft 17 which is mounted in bearings 20 near the front end of the machine, the bearings being adjustable by means of screws, one of which is shown at 21, to regulate the tension of the chains. The rear sprocket wheels 22 are carried by a shaft 23 mounted in the main frame. The two conveyor chains are connected by transverse flights 24 which travel over the tables, and the ears of corn are placed on the upper table 8 between the flights of the upper stretch of the conveyor and are moved thereby to and past the butt removing device, and the debutted ears are then moved through a curved chute 25 to the lower feed table 9 over which they are moved to the passageway 15 by the flights of the lower stretch of the conveyor.

As has been stated, the ears of corn will sometimes lodge between the flights of the conveyor and will be carried thereby beyond the passageway 15 and as the conveyor moves about the front sprocket wheels 18 the flights will separate sufficiently to release the ear and the latter will drop from the machine onto the floor. To reduce as far as possible this tendency of the ears to lodge between the flights of the conveyor there is mounted above the lower stretch of the conveyor a dislodging device which will act upon the ears as they are moved above the passageway and will discharge the same unless they are very tightly lodged in the conveyor. As here shown, this dislodging device comprises a plurality of resilient fingers 26 extending lengthwise of the lower stretch of the conveyor above the same and in the arrangement here shown these fingers are secured at their rear ends to a transverse bar 27 which in turn is connected by resilient arms 28 with a transverse bar 29 mounted in the main frame. Near their forward ends the fingers 26 are provided with downwardly extending portions, such as V-shaped depressions 30, which, due to the resiliency of the device, tend to enter the spaces between adjacent flights and to dislodge the ears therefrom. The depressions 30 having inclined walls will be moved upwardly out of the depressions by contact with the forwardly moving flights so that they ride over those flights and enter the successive spaces between the flights.

Tightly lodged ears may not be displaced by the dislodging device and in order that such ears may not be discharged from the machine but may be again moved to the passageway leading to the husking rollers, there is provided beyond the passageway a guide, such as a curved plate 31, which leads upwardly from the lower feed table 9 at a point beneath the front sprocket wheels 18 to a point above those sprocket wheels, and is spaced from the conveyor just far enough to provide ample clearance for the flights of the conveyor. This guide thus forms a continuation of the lower feed table and any ear which is carried beyond the passageway 15 will be retained, by the guide 31, in engagement with the conveyor, and will be carried upwardly thereby onto the upper feed table and then again moved over that table past the butt removing device and over the lower feeding table 9 to the passageway 15, and by this time it will usually have been loosened sufficiently to permit of its discharge from the conveyor. While such ears pass the butt removing device a second time the debutted ends thereof will not enter the space between the gaging elements 11 and 12 and consequently the cutter will remove little if any of the ear during this second passage thereof. The guide plate 31 is preferably adjustable so that it may be maintained in proper relation to the conveyor when the latter is adjusted. For that purpose it is provided with a base plate 32, preferably formed integral therewith, and having slots 33 through which extend bolts 34 to adjustably connect the guide with the feed table 9.

Should the ears accumulate in the chute 16 in substantial numbers they may have a tendency to lodge therein in such a manner as to obstruct the chute. To avoid this there is provided an agitator which is mounted exteriorly of the chute but acts upon the ears within the chute to displace the same and thus to prevent the ears from lodging in such a manner as to obstruct the chute and prevent the ears from falling onto the husking rollers. In the present instance there are two agitating devices both of which are rotatable and are mounted respectively adjacent to the front and rear walls of the chute, as shown at 35 and 36. Each agitating device is provided with a plurality of arms 37, in the present instance two, which, as the devices rotate, project through vertical slots 39 in the walls of the chute so as to engage the ears within the chute.

The husking rollers 13 are shown as inclined downwardly and rearwardly so that the ears of corn will tend to move along the same by gravity but it is sometimes desirable to positively feed the ears along the husking rollers. This can be accomplished by the use of an endless conveyor arranged above the husking rollers but if the flights of such a conveyor are of sufficient width to properly engage the ears they are apt to interfere with other parts of the mechanism, such as the agitator arms 37. To avoid such interference we have in the present machine provided above each pair of husking rollers an endless conveyor 40 which is supported at its rear end on a sprocket wheel carried by a shaft 43 which is driven from the shaft 36 by a sprocket chain 44. At its front end the conveyor is supported by a sprocket wheel 42 carried by a shaft 45 mounted in bracket arms 46. The lower stretch of the conveyor is spaced above the husking rollers and is provided with a plurality of ear engaging members spaced apart lengthwise of the conveyor and so mounted thereon that they will move by gravity into and out of their operative positions. As here shown, each of these members comprises an arm 47 pivotally mounted on the conveyor at its forward end and having at its rear end a downturned or hook-shaped part 48 adapted to engage the rear end of an ear of corn. As the conveyor travels about its sprocket wheels those members 47 which are on the upper stretch of the conveyor will occupy substantially horizontal positions, being supported in those positions by cross rods or bars 49. As each member passes the sprocket wheel 41 it will move by gravity into a downwardly extending position more or less transverse to the flight of the conveyor, and with its hook-shaped end in ear engaging position, and, as it again moves upwardly about the sprocket 42 it will move by gravity into its horizonal position. In the present instance there is shown above the rollers and near the discharge end thereof a silk removing brush 50 which is pivotally supported by arms 51 and is driven by a sprocket chain 52. The several parts of the machine may be operated in any suitable manner and it is not necessary that the driving connections should be described in detail. Briefly, they comprise a main driving shaft 53 which may be driven from any suitable source of power, as by means of a belt pulley 54, and the power is transmitted from the shaft to the various parts of the mechanism, for the most part through sprocket chains, a part of which are shown but others of which are omitted to avoid confusion in the drawings.

In Figs. 5, 6 and 7 there is shown a similar debutting and husking machine having a somewhat different arrangement of the husking mechanism and ear conveying mechanism. As there shown, the machine comprises a frame 60 including an ear supporting table 61, over which the ears of corn are moved by a conveyor 62 to a butt removing device 63 and a curved chute 64, which chute delivers the ears to husking rollers 65. Means, not here shown, are provided for turning the ears as they pass from the chute to the husking rollers so that they will extend parallel with the husking rollers. The present machine is a double machine so that two rows of ears may be debutted and husked simultaneously but this is immaterial so far as the invention is concerned, each pair of husking rollers functioning as an individual unit.

The husking rollers are inclined downwardly and forwardly so that the ears of corn tend to move lengthwise thereof by gravity, but, as above stated, it is often desirable to positively move the ears along the rollers. As here shown the conveying mechanism comprises a single conveyor which serves both to move the ears to the butt removing device and over the husking rollers. For the purpose of moving the ears past the butt removing device the conveyor is provided with fixed flights 66 but these flights are spaced some distance above the husking rollers and movable members are provided for engaging the ears and advancing the same. These movable members are similar to those above described and comprise arms 67 pivotally mounted on the conveyor and having hook-shaped end members 68 to engage the ears. In the present arrangement the fixed flights 66 are provided at their inner edges with flanges 69 on which the arms 67 are pivotally mounted. As the flights move onto the table 61 the pivoted members 67 assume a horizontal position with the hook-shaped ends close to the succeeding flight 66, and as the pivoted members move from the chute 64 they swing downwardly by gravity so as to engage the ears and move the same along the husking rollers. Any suitable number of ear engaging members may be employed and, in the present instance, we have shown such ear engaging members connected with alternate fixed flights.

While we have shown and described certain embodiments of our invention we wish it to be understood that we do not desire to be limited to the details thereof as various modifications may occur to a person skilled in the art.

Having now fully described our invention, what we claim as new and desire to secure by Letters Patent, is;

1. In a combined corn debutting and husking machine, a butt removing device, a husking device, a passageway leading to the ear receiving end of said husking device, conveying means to move ears of corn to said butt removing device and from said butt removing device to said passageway, and a guide arranged beyond said passageway to cause an ear which is moved past said passageway to be again carried by said conveying means past said butt removing device and to said passageway.

2. In a combined corn debutting and husking machine, a main frame, a butt removing device adjacent the rear end of said frame, a husking device arranged below said butt removing device with its ear receiving end adjacent the front end of said frame, a chute leading to the ear receiving end of said husking device, an endless conveyor to move ears of corn past said butt removing device to said chute, and a curved guide extending about the end portion of said conveyor and so arranged that an ear which passes said chute will be again carried by said conveyor past said butt removing device and to said chute.

3. In a combined corn debutting and husking machine, a main frame, a butt removing device adjacent the rear end of said frame, a husking device arranged below said butt removing device with its ear receiving end adjacent the front end of said frame, an upper feed table leading to said butt removing device, a lower feed table to receive the ears of corn from said butt removing device and having an opening through which said ears may pass to said husking device, a guide leading from the front end of said lower table to said upper table, and means for conveying said ears over said tables to said opening and for conveying an ear which passes said opening to said upper table.

4. In a combined corn debutting and husking machine, a main frame, a butt removing device adjacent the rear end of said frame, a husking device arranged below said butt removing device with its ear receiving end adjacent the front end of said frame, an upper feed table leading to said butt removing device, a lower feed table to receive the ears of corn from said butt removing device and having an opening through which said ears may pass to said husking device, an endless conveyor to move said ears over both tables, and a guide leading from the front end of said lower table about the front end portion of said conveyor to said upper table, whereby an ear which passes said opening will be again moved over said tables to said chute.

5. In a combined corn debutting and husking machine, a main frame, a butt removing device adjacent the rear end of said frame, a husking device arranged below said butt removing device with its ear receiving end adjacent the front end of said frame, an upper feed table leading to said butt removing device, a lower feed table to receive the ears of corn from said butt removing device and having an opening through which said ears may pass to said husking device, a conveyor to move said ears over both tables, a guide leading from the front end of said lower table about the front end portion of said conveyor to said upper table, whereby an ear which passes said opening will be again moved over said tables to said chute, and means for adjusting said guide with relation to said conveyor.

6. In a combined corn debutting and husking machine, a main frame, a butt removing device adjacent the rear end of said frame, a husking device arranged below said butt removing device with its ear receiving end adjacent the front end of said frame, an upper feed table leading to said butt removing device, a lower feed table to receive the ears of corn from said butt removing device and having an opening through which said ears may pass to said husking device, means for conveying said ears over both tables, means arranged above said opening for dislodging the ears from said conveying means, and means arranged beyond said opening for guiding to said upper feed table any ears which are not dislodged from said conveying means by said dislodging means.

7. In a combined corn debutting and husking machine, a main frame, a butt removing device adjacent the rear end of said frame, a husking device arranged below said butt removing device with its ear receiving end adjacent the front end of said frame, an upper feed table leading to said butt removing device, a lower feed table to receive the ears of corn from said butt removing device and having an opening through which said ears may pass to said husking device, means for conveying said ears over both tables, means arranged above said opening for dislodging the ears from said conveying means, a chute leading from said opening to said husking rollers, and an upwardly moving device acting on the ears in said chute to prevent the same from lodging therein.

8. In a combined corn debutting and husking machine, a main frame, a butt removing device adjacent the rear end of said frame, a husking device arranged below said butt removing device with its ear receiving end adjacent the front end of said frame, an upper feed table leading to said butt removing device, a lower feed table to receive the ears of corn from said butt removing device and having an opening through which said ears may pass to said husking device, a conveyor for moving said ears over both tables, including laterally spaced endless members and transverse flights connecting said members, a yieldable dislodging device supported above the lower stretch of said conveyor and comprising fingers extending lengthwise of said conveyor and adapted to enter the spaces between said flights as the latter move above said opening, a chute leading from said opening to said husking rollers, means acting on the ears in said chute to prevent the same from lodging therein, and a device arranged beyond said opening for guiding to said upper feed table any ears which are not dislodged from said conveyor by said dislodging device.

9. In a combined corn debutting and husking device arranged below said butt removing device adjacent the rear end of said frame, a husking device arranged below said butt receiving device with its ear receiving end adjacent the front end of said frame, an upper feed table leading to said butt removing device, a lower feed table to receive the ears of corn from said butt removing device and having an opening through which said ears may pass to said husking device, a conveyor having transverse flights for moving said ears over said tables, a resilient device supported above the lower stretch of said conveyor and having a part arranged to engage said ears and dislodge the same as they are moved into line with said opening, and a guide extending upwardly about the front end portion of said conveyor and so arranged that an ear which is not dislodged from said conveyor will be retained in engagement with said conveyor and again moved over said tables.

10. In a combined corn debutting and husking machine, a main frame, a butt removing device adjacent the rear end of said frame, a husking device arranged below said butt removing device, a chute to deliver debutted ears of corn to the ear receiving end of said husking device, means for moving said ears past said butt removing device to said chute, and a device movably supported exteriorly of said chute and having a part to extend into and move upwardly through said chute to move a part of the ears in said chute upwardly with relation to other ears therein and thus prevent said ears from lodging in said chute.

11. In a combined corn debutting and husking machine, a main frame, a butt removing device adjacent the rear end of said frame, a husking device arranged below said butt removing device, a chute to deliver debutted ears of corn to the ear receiving end of said husking device, means for moving said ears past said butt removing device to said chute, a device movably supported exteriorly of said chute and having a part movable upwardly through said chute to displace the ears therein with relation one to the other and prevent the clogging of said chute, and a feeding device arranged above said husking device exteriorly of said chute to engage the ears that have been discharged from said chute and move the same over said husking device.

12. In a combined corn debutting and husking machine, a main frame, a butt removing device adjacent the rear end of said frame, a husking device arranged below said butt removing device with its ear receiving end adjacent the front end of said frame, a chute leading to the ear receiving end of said husking device, means for moving ears of corn past said butt removing device to said chute, said chute comprising front and rear walls having vertical slots, and devices rotatably mounted exteriorly of said chute adjacent the respective slotted walls and each having fingers arranged to move through the slot in the adjacent wall and act on an ear in said chute to move the same upwardly with relation to other ears in said chute to prevent the clogging of the chute.

13. In a combined corn debutting and husking machine, a main frame, a butt removing device adjacent to the rear end of said frame, husking rollers arranged below said butt removing device, a chute leading to said husking rollers, means for moving ears of corn past said butt removing device to said chute and over said husking rollers, said means including an endless conveyor having one stretch movable lengthwise of said husking rollers in spaced relation thereto, and ear engaging members mounted on said conveyor for movement with relation thereto into ear engaging positions as they approach said husking rollers, and into inoperative positions as they move from said husking rollers, and means acting on the ears in said chute to prevent the same from lodging therein.

14. In a combined corn debutting and husking machine, a main frame, a butt removing device adjacent to the rear end of said frame, husking rollers arranged below said butt removing device, a chute leading to said husking rollers, means for moving ears of corn past said butt removing device to said chute and over said husking rollers, said means including an endless conveyor having one stretch movable lengthwise of said husking rollers in spaced relation thereto, and ear engaging members pivotally mounted at their forward ends on said conveyor and having hook-shaped parts at their rear ends, said members being arranged to move by gravity to ear engaging positions transverse to the lower stretch of said conveyor and to positions substantially parallel with the upper stretch of said conveyor.

15. In a corn husking machine comprising husking rollers, and a conveyor to deliver ears of corn to said rollers and having a portion extending lengthwise of said rollers, ear engaging members mounted on said conveyor for movement with relation thereto and arranged to move into ear engaging positions as they approach said rollers and to move into inoperative positions as they move beyond said rollers, each ear engaging member having a part to engage the end of an ear and advance the latter without preventing the rotation of said ear by said husking rollers.

16. In a corn husking machine comprising husking rollers and a conveyor having one stretch extending above and lengthwise of said rollers, ear engaging members supported normally in positions substantially parallel with said conveyor and pivotally mounted thereon for movement to positions transverse to and below said conveyor as they approach said rollers, each ear engaging member having at its free end a projection to overlap and engage the butt end of an ear and advance the latter while leaving said ear free to rotate under the action of said husking rollers.

17. In a corn husking machine comprising a butt removing device, husking rollers arranged below said butt removing device, and an endless conveyor having an upper stretch leading to said butt removing device and a lower stretch above and extending lengthwise of said husking rollers, said conveyor having flights to advance the ears to said butt removing device, ear engaging members pivotally mounted at their forward ends on said conveyor and having hook-shaped parts at their rear ends, said members being arranged to extend lengthwise of said conveyor as they approach said butt removing device and to move by gravity to transverse positions below said conveyor as they approach said husking rollers.

18. In a combined corn debutting and husking machine, a main frame, a butt removing device adjacent the rear end of said frame, a husking device arranged below said butt removing device with its ear receiving end adjacent the front end of said frame, an upper feed table leading to said butt removing device, a lower feed table to receive the ears of corn from said butt removing device and having an opening through which said ears may pass to said husking device, means for conveying said ears over both tables, and means arranged above said opening for dislodging the ears from said conveying means.

WILLIAM W. MORRAL.
SAMUEL E. MORRAL.